United States Patent
Eng et al.

(10) Patent No.: US 10,688,393 B2
(45) Date of Patent: Jun. 23, 2020

(54) SOUND ENGINE FOR VIDEO GAMES

(71) Applicant: Elias Software AB, Nacka (SE)

(72) Inventors: Kristofer Eng, Nacka (SE); Philip Bennefall, Stockholm (SE)

(73) Assignee: Elias Software AB, Nacka (SE)

( * ) Notice: Subject to any disclaimer, the term of this patent is extended or adjusted under 35 U.S.C. 154(b) by 0 days.

(21) Appl. No.: 15/119,976

(22) PCT Filed: Feb. 26, 2015

(86) PCT No.: PCT/SE2015/050218
§ 371 (c)(1),
(2) Date: Aug. 18, 2016

(87) PCT Pub. No.: WO2015/147721
PCT Pub. Date: Oct. 1, 2015

(65) Prior Publication Data
US 2017/0056772 A1  Mar. 2, 2017

(30) Foreign Application Priority Data
Mar. 26, 2014  (SE) .................................. 1450351

(51) Int. Cl.
| A63F 13/54  | (2014.01) |
| A63F 13/69  | (2014.01) |
| A63F 13/63  | (2014.01) |
| A63F 13/814 | (2014.01) |
| A63F 13/67  | (2014.01) |
| A63F 13/50  | (2014.01) |

(52) U.S. Cl.
CPC .............. *A63F 13/54* (2014.09); *A63F 13/50* (2014.09); *A63F 13/63* (2014.09); *A63F 13/67* (2014.09); *A63F 13/69* (2014.09); *A63F 13/814* (2014.09)

(58) Field of Classification Search
CPC .......... A63F 13/54; A63F 13/63; A63F 13/69; A63F 13/814
See application file for complete search history.

(56) References Cited

U.S. PATENT DOCUMENTS

| 5,663,517 A    | 9/1997  | Oppenheim  |              |
| 7,690,993 B2 * | 4/2010  | Totaka     | G10H 1/0025  |
|                |         |            | 463/23       |
| 2003/0037664 A1* | 2/2003 | Comair    | G10H 1/0025  |
|                |         |            | 84/609       |
| 2008/0156176 A1 | 7/2008 | Edlund     |              |

(Continued)

FOREIGN PATENT DOCUMENTS

EP  1 225 565 A2  7/2002

Primary Examiner — Werner G Garner
(74) Attorney, Agent, or Firm — Blank Rome LLP

(57) ABSTRACT

The present invention relates to a sound engine for use in a video game, said sound engine being arranged to, in use, generating an output signal representing a first music composition for being played back by means of sound reproducing means, characterized in, said sound engine including means for generating said output signal from at least two tracks arranged to be played together as a music composition, each of said at least two tracks comprising at least two track versions, said track versions being selectable for being played when said track is included in said first music composition. The invention also relates to a video game, a video game device and a music composer tool.

16 Claims, 3 Drawing Sheets

| TRACK LEVEL | 1 LEAD | 2 PERCUSSION | 3 STRINGS | 4 OTHER |
|---|---|---|---|---|
| 1. | LEAD 1 | PERCUSSION 1 | STRINGS 1 | OTHER 1 |
| 2. | LEAD 2 | PERCUSSION 2 |  | OTHER 2 |
| 3. | LEAD 3 |  |  | OTHER 3 |
| 4. |  | PERCUSSION 4 | STRINGS 4 | OTHER 4 |
| 5. | LEAD 5 |  | STRINGS 5 | OTHER 5 |
| 6. |  |  | STRINGS 6 | OTHER 6 |
| 7. |  |  |  | OTHER 7 |
| 8. | LEAD 8 | PERCUSSION 8 | STRINGS 8 | OTHER 8 |

(56) References Cited

U.S. PATENT DOCUMENTS

| | | | |
|---|---|---|---|
| 2008/0236370 A1* | 10/2008 | Sasaki | A63B 71/0686 |
| | | | 84/612 |
| 2009/0082104 A1* | 3/2009 | Hegstrom | A63F 13/10 |
| | | | 463/35 |
| 2010/0307320 A1 | 12/2010 | Hoeberechts et al. | |

* cited by examiner

FIG. 3

| LEVEL \ TRACK | 1 LEAD | 2 PERCUSSION | 3 STRINGS | 4 OTHER |
|---|---|---|---|---|
| 1. | LEAD 1 | PERCUSSION 1 | STRINGS 1 | OTHER 1 |
| 2. | LEAD 2 | PERCUSSION 2 |  | OTHER 2 |
| 3. | LEAD 3 |  |  | OTHER 3 |
| 4. |  | PERCUSSION 4 | STRINGS 4 | OTHER 4 |
| 5. | LEAD 5 |  | STRINGS 5 | OTHER 5 |
| 6. |  |  | STRINGS 6 | OTHER 6 |
| 7. |  |  |  | OTHER 7 |
| 8. | LEAD 8 | PERCUSSION 8 | STRINGS 8 | OTHER 8 |

SOUND ENGINE FOR VIDEO GAMES

FIELD OF THE INVENTION

The present invention relates to sound engines for video games, and in particular to music engines for video games where playback of music depends on actions being taken in the video game. The invention also relates to a video game and a video game device.

BACKGROUND OF THE INVENTION

Video games constitute electronic games that involve human interaction by means of an interface to generate visual feedback on a display device. A video game can be designed for one or more platforms, and examples of such platforms are personal computers (PC), game consoles, arcade games etc. In general, the term video game encompasses any kind of electronic game that output data for being displayed on a display device.

In addition to data being displayed on a display, video games usually comprises additional means to provide information to a player of the game. Such additional information can e.g. consist of tactile feedback, and, further, an almost ever present way of providing additional information is use of audio information. The audio information can comprise various kinds of information, such as e.g. playback of sound effects and music pieces, where the audio information can be played back to the player/user of the game using any kind of suitable sound reproduction devices, such as e.g. speakers and/or headphones.

The present invention relates in particular to playback of music pieces. With regard to video games, music can be composed specifically for the video game, much in a similar manner to e.g. motion pictures. With regard to the composition of music for video games, however, there are aspects that differ from the world of motions pictures that needs to be taken into consideration.

SUMMARY OF THE INVENTION

It is an object of the present invention to provide a sound engine for use in playback of music in a video game that allows very natural behavior of the music. This is accomplished by a sound engine according to claim 1.

According to the present invention, it is provided a sound engine for use in a video game, said sound engine being arranged to, in use, generating an output signal representing a first music composition for being played back by means of sound reproducing means. The sound engine includes means for generating said output signal from at least two tracks arranged to be played together as a music composition, each of said at least two tracks comprising at least two track versions, said track versions being selectable for being played when said track is included in said first music composition.

Video games often comprise musical pieces that are specifically composed or adapted for the video game. Similar to motion pictures, it is often essential to the viewer/player that the music reflects the events that are being displayed.

With regard to motion pictures, these follow a course of action from beginning to end, and the music to be played back as the movie progress can be composed with high precision to harmonize with the events taking place in the motion picture. The motion picture will always replay in the same manner, and hence the music will also always be on par with the story being told, with appropriate changes in dynamics of the music as scenery changes.

With regard to video games, on the other hand, the situation is somewhat different. Video games are inherently interactive, and even though video games can comprise sections having a motion picture character, at least some events taking place in the game are often arranged to be influenced by the actions of the player. This in turn, means that the game can include alternative routes, and e.g. particular actions to be performed in the game can take different amounts of time, e.g. in dependence of the skills of the player. This also means that music must be composed in a different manner. With regard to video games it is not possible to know when a certain event will occur, and hence music cannot be composed as in a movie. Instead the compositions are arranged to run in loops since the time it takes for a player to perform a task can vary substantially from one time to another, and from one player to another. For example, if a player stops and waits for some time, the music has to be on the same "level" until the player starts moving again.

This has the result that music will repeat over and over again, which can tend very annoying to the player after a while. The present invention provides a solution that creates the impression of actually having an orchestra playing live while playing the game.

This is obtained by a sound engine for use in a video game, where the sound engine generates an output signal representing a first music composition, where the output signal is formed from at least two tracks arranged to be played together as a music composition, e.g. as separate stems, where each of said at least two tracks comprising at least two track versions, so that the music composition can be varied by varying the combination of track versions being played.

The present invention has the advantage that e.g. a frequently occurring melody, which after a while e.g. can tend very repetitive to the frequent user if being played over and over again, often with noticeable looping points, can be varied in a manner that provides the feeling of a presence of a music director to the player, thereby removing the sense of repetition to the user, and thereby also the often felt urge to turn off the music.

Further features of the present invention and advantages thereof will become clear from the following detailed description of illustrative embodiments and from the attached drawings.

BRIEF DESCRIPTION OF DRAWINGS

The invention will now be described in greater detail with reference to the drawings, wherein:

FIG. 3 shows the structure of a music composition according to the present invention;

DESCRIPTION OF EXEMPLARY EMBODIMENTS

The present invention relates to a sound engine, e.g. a music engine, for video game devices, and is not dependent on video game device specific hardware, but is applicable to any kind of platforms being used for video games, such as portable and stationary game consoles, computers etc. Nonlimiting examples of current platforms in which the present invention can be utilized includes Microsoft game consoles, Sony game consoles, Nintendo game consoles, where the various mentioned game consoles include both stationary and portable game consoles, personal computers.

The invention will be exemplified without reference to any particular game platform, since the general inventive concept is applicable for any kind of game platform.

Figure 1:
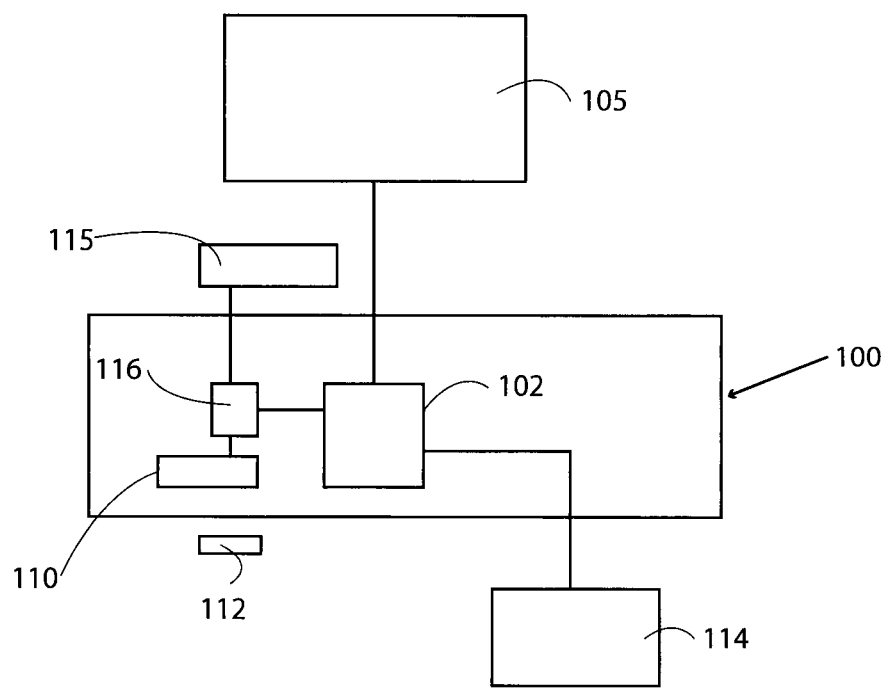
FIG. 1 shows an exemplary video game device according to the present invention.

FIG. 1 discloses an exemplary video game device 100 which is to be seen only as an example, where video game devices for which the present invention is equally applicable can vary substantially from the video game device 100 exemplified herein.

The video game device 100 of FIG. 1 can be used by one or more users, e.g. players, e.g. for playing video games. The video game device 100 is connected to a display device 105 for displaying, when in use displaying a video game, video game related information. According to the disclosed embodiment, the display 105 is shown as being separate from the game device 100, which, e.g. is common with regard to stationary game consoles, but as is realized, according to one embodiment the display 105 constitutes an integral part of game device 100, e.g. when the gaming device is a portable device such as a portable game console or a laptop computer. The video game device 100 further comprises a media reader 110, which is arranged to receive a video game to be played, where the video game is stored e.g. at least partially in a computer program format on a suitable non-transitory storage device 112 to be inserted in the media reader 110 when the game is to be played.

With regard to the storage device 112, this can be of any suitable kind, such as, e.g., a compact disc read-only memory (CDROM), a digital versatile disc (DVD), a Blu-Ray disc (BD), a game cartridge, a media card or any other suitable physical storage media that the media reader 112/video game device 100 includes means for reading. The video game device 100 can also be arranged to communicate with external media readers, and/or be arranged to receive game data via a wired or wireless network connection, e.g. from a local network storage or the Internet. The game device 100 can also be arranged to internally store video games, e.g. on built-in memory.

One or more users can communicate with the video game through the video game device 100 by means of suitable control means 114, which, as is known, can consist of one or more from a number of various control devices, such as e.g. game controllers, keyboards, etc.

The video game device 100 further includes a processing unit, such as a central processing unit CPU 102. The video game device 100 can be arranged to include a number of processing units, e.g. specialized on different tasks such as calculations, graphics etc and/or being arranged to operate in parallel. This, however, is not exemplified herein. According to the disclosed embodiment, the sound engine according to the present invention, in the following denoted music engine, is implemented by computer software, which can be included as a portion of the game 112 or constitute an integrated part of the video game device 100, shown as 116 in FIG. 1. Integration of the music engine according to the present invention in a video game has the advantage that the invention can be implemented for new games to be played on existing platforms without the need for any modification of the game platforms. Also, music is often composed for a video game specifically, and suitable parameters for use when controlling the music can be stored with the game. When the music engine constitutes part of the video game device game specific parameters can be transferred from the game to the music engine of the video game device when the game is to be played, or continuously as part of requests to the music engine.

According to the present example, in use, a video game 112 is inserted into the media reader 110 to provide access to the programming stored thereon. The software/data relating to the game, e.g. including the music engine according to the present invention, can then be arranged to, in use, at least partially be loaded into internal memory of the video game device 100.

In general, a video game comprises a software code that is compliant with the video game device 100 and which provides instructions that are executed by the one or more processors of the video game device 100 to provide the gaming experience that the user exhibits when playing the game. In addition to the software code, the video game can comprise e.g. pictures and video to be displayed, and also music to be reproduced by means of audio reproduction means. For example, an audio output signal for being played back can be generated, which can be played back e.g. by suitable loudspeakers 115 or earphones being connected to, or integrated in, the video game device 100.

In the course of playing a video game, the user/player interacts with the video game using one or more game controller means 114 according to the above. The player provides instructions as to how the game is to progress, and hence the manner in which a game is being played can vary from one time to another, and from one player to another. The game responds on the commands issued by the player e.g. by generating a display output in dependence of the commands input by the user for being displayed on the display 105. Similarly, the user commands can generate an audio output signal for being reproduced e.g. by loudspeakers 115.

The current state of the game will inherently be dependent on the actions taken by the player, and when a video game is created it is also determined how the game will react upon control signals from the player, and what the player is to achieve when playing the game. As was mentioned above, it is, however, impossible for the creators of a video game to foresee precisely the way in which the game is being played. This also means that there is a risk for a repetitive behavior in some aspects, and, as stated above, this relates, for example, to music being played while playing the game.

With regard to motion pictures, music can be arranged to smoothly progress as the movie progress since the music producer has knowledge of the exact story. The video game designer, or music producer for the video game, cannot rely on such knowledge, since the manner in which a player acts, or choices being made, at a particular location in a game may vary substantially from one player to another, with the result that musical pieces are often looped a number of times e.g. when the player is attempting to solve a problem for an extended period of time, or takes a break. Such situations cannot be anticipated by the game developer or music composer, and hence undesired music repetitions where a single piece of music is playing over and over again are often unavoidable. In time, this can give rise to substantial annoyance, and music is oftentimes turned off in these situations.

Figure 2:
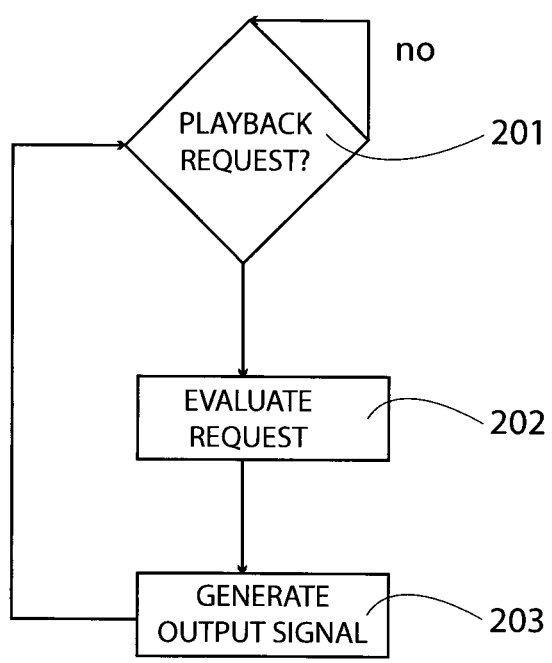
FIG. 2 shows an exemplary method according to the present invention.

These drawbacks are mitigated by the present invention, and an exemplary method 200 illustrating features of the music engine according to the invention is disclosed in FIG. 2. The method starts in step 201, where it is determined whether there is a request from the game in regard of music to be played back. As was mentioned above, when there is a change of state in the game where a change in the music being played back is desired, the game/game controller can request a change of the current music being played to match the events occurring in the game. For example, such changes in the music can, e.g., be arranged to take place when the player leaves one scene and enters another, or when something unexpected happens or is about to happen in a current scene. The present invention does not relate to the reasons for changing the played back music, but rather for accomplishing the change in a novel manner.

Consequently, when the music engine receives a request for a change in played back music the method continues to step 202, where the request is evaluated, and music to be played back is determined. An output signal is then generated in step 203, which can be played back e.g. through loudspeakers 115. One of the main aspects of the present invention is the manner in which a piece of music is being played back, and in particular in which manner changes in the played back music is handled in step 203. This is described below. Another main aspect of the present invention is the manner in which a piece of music is built up.

The music engine generates the output signal for being played back based on input data received from the game, where the instructions determined by the game in step 201 can e.g. be very specific in regard to what is to be played. For example, the game can be arranged to specify precisely which versions of which tracks (this is explained below) that are to be played back according to the present invention.

Alternatively, the request can be more general in that e.g. a level is requested by the game reflecting the current state of the game, where different levels e.g. can be arranged to represent different dynamics, e.g. in terms of softness and/or intensity in the music.

For example, the levels can be arranged to represent the general terms p, or piano, i.e. "soft" and f, or forte, i.e. "loud", so that the game can request a suitable level e.g. based on the current events in the game. It is also possible to use a more diversified differentiation of the levels, and, according to one example one or more from the following well known levels can be used:

ppp, "piano pianissimo", that is, "softest possible";
pp, or pianissimo, "very soft";
mp, or mezzo-piano, "moderately soft";
mf, mezzo-forte, "moderately loud";
ff, fortissimo, "very loud";
fff, forte fortissimo, "loudest possible";

According to one embodiment, any suitable number of levels can be used to represent different dynamics in the music. In principle, the limit is set by the number of variations of different dynamics that a composer is capable or willing to compose. It is known that a piece of music can consist of a number of tracks, or stems, which are concurrently being played back in a synchronous manner, to form the final piece of music being played back to the player. The present invention also utilizes a number of tracks for generating the final piece of music. A track according to the present invention is therefore not defined as a complete musical composition, but one of a number of tracks (or stems) that can be arranged to play individually, but which are also composed for being played together as a composition in harmony.

Use of a number of tracks has the advantage that subsets of the total number of tracks can be played to thereby provide changes in the music, e.g. by omitting or adding one or more groups of instruments. According to the invention, however, further alternatives are provided.

With regard to the tracks, these can consist of different instruments or different groups of instruments, but the tracks can also be arranged to vary from each other in other ways. A novel feature of the present invention is that the tracks include a number of track versions, where the various track versions, or track compositions, still are arranged to play together in harmony with the various track versions of other tracks. The various versions within the tracks consequently constitute portions of a composition, where the final composition can include basically any version of any track, where a number of tracks are concurrently being played in a synchronized manner. There can also be a number of track versions of any number of tracks playing synchronized in harmony.

This is illustrated in FIG. 3, which shows the manner in which a music composition can be divided into tracks, where each track e.g. can represent one or more from the group: lead/melody, comp/backing, percussion, strings, brass, woodwind, effects, individual instruments or instrument groups. In principle, however, any suitable manner of defining the tracks can be used.

According to the present example shown in FIG. 3, the music composition comprises four tracks denoted lead, percussion, strings and other. Each of the tracks further includes a number of track versions. The track versions are of limited length and at least some are arranged to be played a number of times in a row, i.e. capable of being looped. According to one embodiment these track versions are labeled with a level 1-8, where the level can be e.g. according to the above, and where a track can comprise track versions for each level, or for only some of the levels as shown in FIG. 3. There can also be different track versions within a track for a specific level.

According to one embodiment, lower levels represent softer versions of a given track, while higher levels represent more dramatic or intense versions, or vice versa. The track versions of a track preferably fit musically with all other track versions of that track, as well as the track versions of other tracks. Consequently the versions share key and tempo to be interchangeable, thereby allowing a large number of playback variations according to the below.

According to one embodiment, the music composer decides the number and kinds of tracks to be used, and number of track versions for each track, and for which levels. Consequently, the composer can leave blank spots, e.g. if that particular track is to be silent when the level is being requested. With regard to the example of FIG. 3, track 1 includes track versions for levels 1, 2, 3, 5 and 8. Track 2 includes track versions for levels 1, 2, 4 and 8 etc.

The game can be arranged to request a level, and the music engine then decides which versions that should be selected for the various tracks that make up the composition. For example, if the game requests level 5, the first, third and fourth track would select track version 5 since this track version represents an exact match. Track 2, on the other hand, does not have a level 5 version. In this case the music engine be arranged to leave track 2 muted. Alternatively, the music engine can be arranged to select the version that is closest to version 5. In this example this would be version 4 or 6, and since there is only version 4 and no version 6, version 4 would be selected.

Had neither a version 4 or 6 been present the music engine can be arranged to select the version that is the least number of levels from the requested level, or leave the track muted. Further, had there been both a level 4 version and a level 6 version selection could be arranged to depend on the version the track was using prior to the request. If it was at version 2 before the request was made, it can be arranged to choose version 4 rather than 6. On the other hand, if it was at version 8 before the request, version 6 could be selected instead.

The method of FIG. 2 is carried out when playing the video game, and can be arranged to be continuously performed for as long as the video game is being played. Consequently, when the output signal has been generated in step 203, the method returns to step 201. In general, there are numerous situations that triggers a change in the played back music during a video game, e.g. due to events occurring in the game, but according to the present invention also in order to provide variation in the music being played back. Consequently, the request from the game in step 201 can consist of a request for a specific level of the music, such as a level from 1-8 according to FIG. 3.

Consequently, a novel feature of the present invention is that several synchronized tracks are used as input for producing a single output musical composition which is a mix of selected tracks. This has the advantage that music being played will not be as static as in the prior art, since the composition of music can be varied almost endlessly by changing versions of one or more tracks, or the particular tracks being played. Also, a number of track versions of a single track can be arranged to be played, with the result that the final composition can be arranged to sound as an almost never ending composition even though the individual variations can be relatively short in length.

When the game specifies playback levels, it does not actually have to know the version numbers used by the music engine. Instead, for example, a percentage value or any other suitable level representation can be used, and which is then converted to a corresponding level value. This has the advantage that the game content designer is free to control the music without the need to know the exact details of the underlying composition.

The present invention further provides another novel feature having a major impact on the output signal, and hence on the played back music. This feature relates to the shifts from one track version to another.

When performing a transition from one track version of a track to another, the manner in which the transition is performed will have impact on the manner in which the played back music is perceived by the player. If the transition is abrupt, this will be very obvious to the player, and hence the composition will not appear as a single music piece in such circumstances. The effect of abrupt transitions can be mitigated by the present invention e.g. by performing transitions between track versions for one track at a time. The remaining tracks will then continue to play, and hence there will not be an abrupt transition of the compete composition as in the prior art, which indicates the beginning and an end of the music piece.

The present invention provides for several methods for creating smooth transitions, the perhaps most advantageous of which being explained further below. With regard to transitions, fades can be applied to the individual tracks. If a track is silent, for instance, and a change is made that causes the silent track to switch to playing audio material, it would usually be very apparent to the listener if the new audio simply started playing immediately. Instead, a gradual fade can be applied so that the inclusion of the new audio in the mix that currently is being played sounds more natural.

If a transition is made from one existing version to another for a given track, a crossfade can be applied, i.e. that the old version is gradually faded out while the new one is faded in at the same time. These two fades are then put together to cause the new trigger to gradually blend in with the old one which eventually disappears. Similarly, if a track goes from an active state, i.e. playing, to an inactive silent state, the old audio can be faded out smoothly rather than just being stopped abruptly.

The aspects of fades and crossfades can be arranged to be set for every track individually, and also for every track version individually, where the specific parameters can be arranged to be set e.g. by the composer to ensure desired transitions, where the particular settings can be arranged to depend e.g. on the type of instruments of the particular version.

For example, drums can be arranged to fade quickly, since it would not be particularly realistic if a drum loop slowly morphed into another over the course of a few seconds. Instead, it can be desirable if the drums change substantially instantaneously. On the other hand, a large choir changing immediately would produce a very choppy sound. Instead, such transitions can be arranged to take e.g. one or two seconds, or a significantly longer period of time. This is also part of one main aspect of the present invention, i.e. that transitions from one track version to another are allowed to take different times in dependence of the kind of music being played, and where the transitions can be customized by the composer and/or game creator, e.g. based on the instrument type. This provides one substantial advantage of the present invention, the player gets the impression of listening to a real ensemble or orchestra. Consequently, a transition can be requested based on game state, but the music engine according to the invention will not perform the change immediately upon the request if the music being played by track versions to be changed does not allow immediate change without negative aspects in the listening experience.

The present invention has the aim to provide a listening experience much resembling what is being experienced in a real life concert. The present invention therefore provides more intelligent methods for performing transitions the fading described above. Ideally, transition occurs without using fades, since fading oftentimes will decrease the realism of the listening experience. Therefore, according to one embodiment, "smart fades" are used. When smart fades are used, the music engine will check if one or both of the track versions involved in a transition is about to be silent for a brief period of time, an instantaneous transition will be performed in the silent period.

The most preferable scenario is that both track versions are silent at the point of the transition, in which case transition can be immediately performed without use of any fades whatsoever. This, however, is rarely the case, for which reason rules can be used by the music engine to determine when it is appropriate to switch immediately even if only one of the track versions is silent. Such rules can also be applied during fade in and fade out operations, and not just during crossfade operations.

This is exemplified by the following example, where it is assumed that one of the tracks is a choir track, where a switch from one choir version to another is to take place. The choir version being switched from is loud, and contains vocal. As a result, there will be pauses when the choir takes breaths. Assuming that the choir version being transitioned to is a much softer choir with no words and no pauses results in a transition that is comparatively extreme. If regular fades are used to transition from the loud choir version to the quiet version, provided a long crossfade period of time, the first choir will be heard singing loudly while fading out slowly.

To an experienced listener it will be immediately obvious that a transition is taking place, since the choir is still technically singing loudly but volume is being turned down. This can provide a satisfactory result, but it is not ideal. By means of the use of smart fades, instead, at the earliest opportunity, presumably when the louder choir takes a breath, the choir will be stopped immediately. This will result in the old version ending on a natural phrase boundary, while the new version continues to fade in simultaneously. This gives a significantly more natural result than merely using traditional fading.

The invention also provides means for natural reverberation. If reverb is applied at a recording stage to two track versions being transitioned between, and a transition is performed using crossfade, the reverb would crossfade along with the rest of the sound, and the result would be a transition from one recording room into an entirely different recording room. Therefore, according to one embodiment, the music engine allows crossfade between two track versions that are recorded without reverb and then apply a reverb effect to the resulting mix. In this case the reverb would effectively follow the transition, and it would sound as though the two audio sources were being heard in the same virtual space. This is not only effective as a means of hiding any unnatural side effects caused by the crossfade, but also preserves the notion of a natural space in which the ensemble or orchestra resides. If crossfade is performed from a loud audio source to a quiet audio source, the reverberation of the louder signal would linger for a while even after the original sound had stopped and the quiet signal had taken over.

This reverb feature of the invention becomes especially advantageous when smart fades according to the above are used along with the reverb, as this produces transitions that are absolutely seamless.

In the following a further very advantageous feature of the present invention will be described. According to the above, each version of a track has a weight which corresponds to its number. In other words, the triggers are considered to be a rising sequence and therefore ordering is important in terms of dynamic in the music. According to another embodiment, which e.g. can be arranged to be used during periods of time when the game is static in terms of events happening, and/or when the player is at a same location in the game for a period of time, weight/ordering according to the above is not used.

According to this embodiment, the tracks include different versions, which still are different versions on the same track, but which have similar dynamic levels. Contrary to the above, when a level or percentage is requested, a number of tracks for which track version is to be switched can be used. Consequently, the music engine can receive a reference referring to the number of the total number of tracks that should be changed. If all versions are considered to be substantially equal in terms of musical dynamics and intensity, the music engine can be arranged to randomly select any version of one or more of the tracks. This really provides for endless variation of the music being played. For example, if five tracks each being provided with five track versions are being used, more than 3000 variants of the played back music can be created.

Furthermore, when the request for level remains the same for a period of time, or when a subsequent request indicates a same level, the music engine according to the invention can be arranged to change levels of one or more tracks to thereby accomplish a variation in the played back music. It can also be possible to select two or more track versions from a single track, thereby enabling even further playback alternatives to reduce repetition.

Further, tracks to be changed and versions involved in the switch can be randomized in order to achieve greatest possible variety. In this way, the same theme can play for a long period of time provided that the game requests a change at regular intervals. Alternatively, the music engine can be arranged to perform switches at suitable intervals.

Consequently, two different modes of using the music engine according to the present invention has been described, where the versions of the tracks in the two modes described above can be arranged to be partially the same, and where two sets of tracks and versions can be arranged to be provided. This second mode of operation is particularly advantageous to use when solving the problem of statically looped background music themes that plays e.g. while the player is attempting to solve a particular problem. Since the music can be arranged to constantly change without really changing in its dynamics, the perceived effect is that of a background track with infinite variety but still entirely logical from a musical perspective.

A further feature of the invention relates to urgency. When a change in music is needed during gameplay, the urgency for performing the change can vary. According to one embodiment, the present invention provides for a method of controlling how quickly this change actually occurs. This can, for example, be indicated by e.g. a percentage value or other suitable value representing the urgency, which can be included in the request from the control of the game indicating the change. The urgency can, for example, be arranged to determine, among other, how quickly the fades and crossfades occur when such are used.

According to one embodiment, a minimum and a maximum value for a given fade type (fade in, crossfade and fade out) is specified. Based on the urgency setting of the transition, an appropriate value is selected within the specified range. For example, if a minimum fade in time is set to 100 milliseconds, and a maximum fade in time is set to 400 milliseconds, there is a range of 300 milliseconds spanning from 100 to 400. If a change is requested with an urgency setting of 50%, the actual fade in time would be 250 milliseconds (the mid of the span).

The urgency setting can also be used to control when the various tracks affected by a given transition actually make their changes. The lower the urgency, the more freely the music engine will determine an appropriate time for each track to switch. If an urgency is set of 100%, the music engine can be arranged to switch affected tracks as quickly as possible, whereas, if the setting is lower, the music engine can be arranged to switch one or two of the tracks first and then wait a little while before it switches the rest. The order in which tracks are switched can also be arranged to be determined not only by rules, but also by a certain amount of carefully controlled randomness, thereby making each transition unique.

Finally, a further useful feature of the invention will be described. According to one embodiment, it is determined points in time, or beat points, where a track is permitted to begin a transition during playback. For example, these points in time can be specified in number of bars and/or beats, e.g. counting from the first beat of the first bar in the track version.

These points in time can be arranged to be a factor or a multiple of the number of beats in a bar in the given time signature, as well as a factor of the total length of the track version in beats.

For example, in this example, if the time signature is 4/4, some permitted values are 1, 2, 4, 8, 16, etc. where it can be required that the permitted values is a factor of the length of the track version as well.

For example, if a value of 4 is specified for a track, the track is allowed to begin a transition between track versions every four beats (e.g. on the first beat of every bar). Similarly if the value is set to 8, transition is permitted once every two bars (each bar being 4 beats).

This function can further be set as "strict", where the music engine treats allowed points in time as an unconditional rule, or less strict, where the music engine e.g. treat the set time values as a recommendation. For example, set points in time can be ignored if it determined that a transition would work well at some other given time (such as when both triggers are silent during a crossfade), or if a transition for some reason must be performed before a set time value (beat point) is reached.

The number can be arranged to always be required to be either a factor or a multiple of the number of beats in a bar in the given time signature, and/or a factor of the total length of the track version in beats. It can also be arranged to be at most the number of beats in the theme.

According to one embodiment, specific beat points can be set for a track version, without any requirement as to e.g. bars, and hence any beat can be set for a transition.

This can apply to all track versions. Further, one or more tracks can be arranged to include "stingers", which e.g. can constitute pieces of music that is not intended for looping, and which can e.g. be of shorter length than track versions that are provided for allowing looping. Start of a stinger can be set e.g. to a specific beat counted from the start of a full-length track version.

In sum, the present invention provides a number of methods for performing transitions between track versions that will result in a music listening experience when playing video games that is very pleasing to the player. The music engine can be arranged to perform transitions according to one or more of the methods according to the invention, and when plural alternatives are used, these can, for example, be prioritized based e.g. on urgency to perform the transitions, or based on other criteria. Different criteria can be used for different tracks.

Further, according to one embodiment, a composer tool for use with a music engine according to the invention is provided, where settings can be customized for transitions etc. on an individual track basis on the composer stage, and where the composer is capable of listening to results in real time, so that parameters can be set that will work well in the game.

Finally, it should be understood that the present invention is not limited to the embodiments described above, but relates to and incorporates all embodiments within the scope of the appended independent claims. For example, a video game and video game device can often be seen as having logically separated modules, such as a music engine. The functionality of the music engine according to the present invention can be arranged to be implemented as a standalone logical unit, or as an integral part of any suitable part of video game or video game device as long as it is capable of generating an output signal for being played back by means of sound reproduction means from at least two tracks arranged to be played as a music composition, where each of the at least two tracks comprises at least two versions that selectively can be played one at a time or plural versions of a track at a time when the track is included for playback. Further, the invention can be applied on each composition of a number of tracks, when a number of compositions are used in the game.

The invention claimed is:

1. A non-transitory computer readable storage medium comprising a video game product, the video game product comprising:
    a sound engine;
    a plurality of music tracks, including at least two alternative versions of each of said plurality of music tracks;
    said sound engine being configured to, when the video game is being played, generate an output signal to be played back by a loudspeaker element, the output signal representing a first music composition to be played back;
    said sound engine being configured to generate said output signal from at least two music tracks of said plurality of music tracks, the at least two music tracks of said plurality of music tracks being arranged to be concurrently and simultaneously played together to form said first music composition; and
    the sound engine being configured to, for each of the plurality of music tracks that are to be simultaneously played, select a track version from said plurality of track versions when generating said output signal, wherein
    the sound engine is arranged to, in response to a request for change of track versions of at least two of said plurality of music tracks, perform transitions between track versions for one of said at least two of said plurality of music tracks at a time and/or initiate a transition for said at least two of said plurality of music tracks at different times, and wherein
    the sound engine is arranged to, in response to the request for change of track versions of at least two of said plurality of music tracks:
        determine if initiation of the transition between track versions is restricted to one or more beat or bar positions, and
        initiate said transition at one of said one or more beat or bar positions when said transition between track versions is restricted to said one or more beat or bar positions.

2. The non-transitory computer readable storage medium according to claim 1, wherein said sound engine generates said output signal representing said first music composition in response to a first request relating to track versions of said plurality of music tracks to be played.

3. The non-transitory computer readable storage medium according to claim 1, wherein the sound engine generates said output signal in response to a first request relating to a current state of the game when being played.

4. The non-transitory computer readable storage medium according to claim 1, wherein said sound engine is configured to generate said output signal from track versions of at least three tracks of said plurality of music tracks.

5. The non-transitory computer readable storage medium according to claim 1, wherein the sound engine is arranged to, in response to the request for change of track versions of one of said plurality of music tracks, apply a fade-in and/or a fade-out of at least one of the track version being stopped and the track version being started.

6. The non-transitory computer readable storage medium according to claim 1, wherein the sound engine is arranged to, in response to the request for change of track versions of at least two of said plurality of music tracks, allow transitions from one track version to another to take different times for different music tracks.

7. The non-transitory computer readable storage medium according to claim 1, wherein the sound engine is arranged to, in response to the request for change of track versions of one track of said plurality of music tracks:

determine whether one or both of the track versions involved in the transition will be silent within a first period of time, and if one or both of the track versions involved in the transition will be silent within said first period of time, perform the transition when at least one of said track versions is silent.

8. The non-transitory computer readable storage medium according to claim 1, wherein the sound engine is arranged to, in response to the request for change of track versions of one of said plurality of music tracks:

determine if initiation of the transition between track versions is restricted to one or more points in time, and initiate said transition at one of said one or more points in time when said transition between track versions is restricted to said one or more points in time.

9. The non-transitory computer readable storage medium according to claim 8, wherein the sound engine is further arranged to determine whether initiation of said transition between track versions of one of said plurality of music tracks is restricted based on a request for said transition.

10. The non-transitory computer readable storage medium according to claim 1, wherein said sound engine is arranged to:

determine if a first time has lapsed since the request for change has been received, and change track versions of at least one of said plurality of music tracks when said first time has lapsed.

11. The non-transitory computer readable storage medium according to claim 1, wherein said sound engine is arranged to perform a transition from a first track version to a second track version of one of said plurality of music tracks on the basis of a state of the game.

12. The non-transitory computer readable storage medium according to claim 1, wherein said plurality of music tracks include different track versions, where different track versions of a music track have similar dynamic levels.

13. The non-transitory computer readable storage medium according to claim 1, wherein said plurality of music tracks include different track versions, where different track versions of a music track have different dynamic levels, said request for change of track versions relating to a dynamic level to be played.

14. The non-transitory computer readable storage medium according to claim 1, wherein said sound engine is arranged to apply different criteria for changing track versions for different tracks of said plurality of music tracks.

15. The non-transitory computer readable storage medium according to claim 1, wherein the video game is arranged to, in response to the request for change of track versions of one of said plurality of music tracks:

determine an urgency for performing said change of track versions, and select a method for performing said change of track version based on said determined urgency.

16. A video game device, comprising the non-transitory computer readable storage medium according to claim 1.

* * * * *